J. C. SCHAF, Jr., AND W. J. HOLLIDAY.
TEST STAND FOR TESTING STARTING MOTORS.
APPLICATION FILED NOV. 20, 1920.
1,401,740.
Patented Dec. 27, 1921.
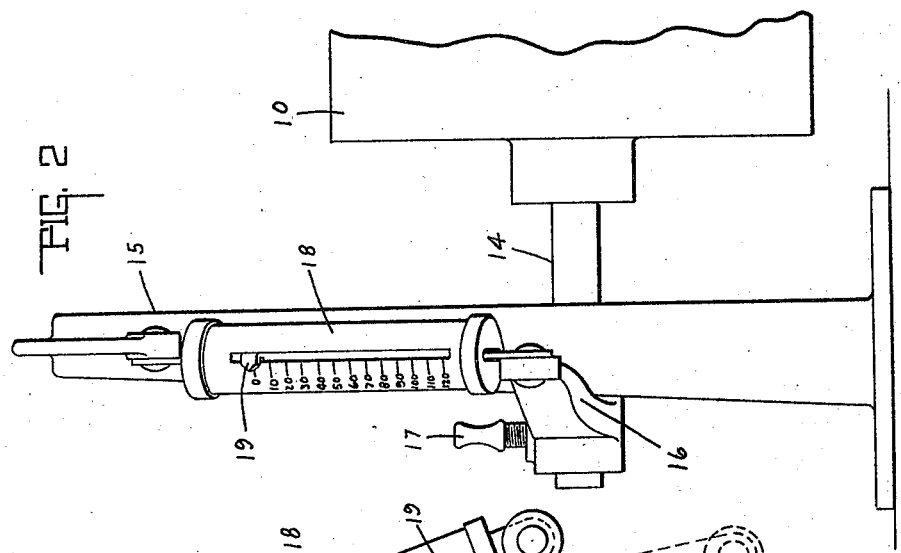
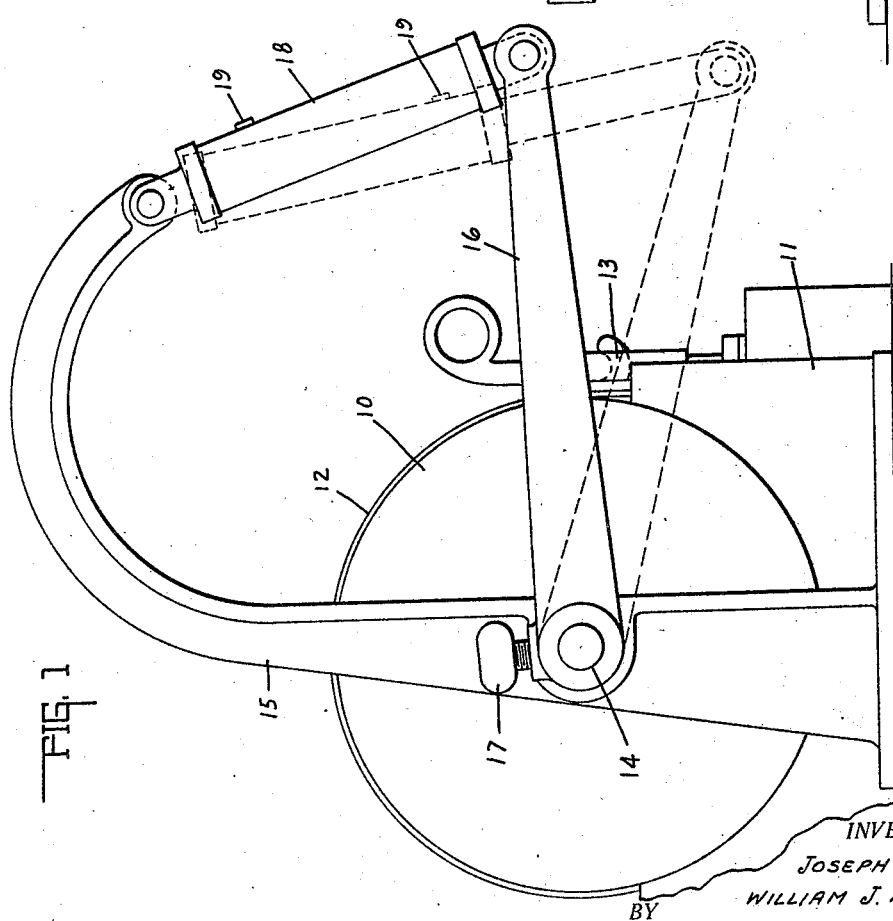
INVENTORS
JOSEPH C. SCHAF Jr.
WILLIAM J. HOLLIDAY.
BY
Lockwood & Lockwood
ATTORNEYS.

UNITED STATES PATENT OFFICE.

JOSEPH C. SCHAF, JR., AND WILLIAM J. HOLLIDAY, OF INDIANAPOLIS, INDIANA.

TEST-STAND FOR TESTING STARTING-MOTORS.

1,401,740.   Specification of Letters Patent.   Patented Dec. 27, 1921.

Application filed November 20, 1920. Serial No. 425,531.

*To all whom it may concern:*

Be it known that we, JOSEPH C. SCHAF, Jr., and WILLIAM J. HOLLIDAY, citizens of the United States, and residents of Indianapolis, county of Marion and State of Indiana, have invented a certain new and useful Test-Stand for Testing Starting-Motors; and we do hereby declare that the following is a full, clear, and exact description thereof, reference being had to the accompanying drawings, in which like numerals refer to like parts.

This invention relates to test stands for electric motors, and particularly that type of electric motor used in connection with the starting of engines used in motor driven vehicles.

The purpose of this invention is to enable the motor to be tested and its strength and capacity measured in foot pounds, and adjusted so as to generate a power of the desired number of foot pounds.

The particular feature of the invention is in the construction of the device for hooking up a motor with a scale whereby it may be readily and conveniently tested and measured.

The full nature of this invention will be understood from the accompanying drawings and the following description and claims.

In the drawings Figure 1 is an end elevation of the motor and measuring device. Fig. 2 is a front elevation of the motor and measuring device.

In the drawings there is shown a motor 10 mounted on a block 11 supported upon the test stand, the motor 10 being strapped and clamped on to the block by means of the metal strap 12 and clamp 13. Mounted on the test stand, and in alinement with the shaft 14 of the motor, there is a crane-like standard 15 securely fixed to the stand at its base and having its upper end curved forwardly and downwardly in the form of an arc. The standard 15 is provided with a bearing through which the shaft 14 of the motor may be extended, on the end of which there is securely clamped an arm 16 by means of the set screw 17.

Pivotally mounted to the overhanging end of the crane-like standard 15 there is a cylindrical spring scale housing 18 containing the usual spring and indicator 19. The lower end of the scale housing 18 is pivotally secured to the other end of the arm 16. The scale is so adjusted as to indicate upon the graduation marks the number of foot pounds exerted at the end of the arm 16, the arm 16 being of such a length as to cause the scale to indicate foot pounds.

The operation of the device is as follows: Where it is desirable that a starting motor be so adjusted as to generate a force or torque of a certain number of foot pounds, it is placed upon the block 11 and clamped in position with its shaft 14 extending through the standard 15 and arm 16. It is then clamped in the arm 16 by the clamp screw 17 and power applied to it whereby it will be caused to revolve with sufficient pressure to compress the spring of the scale as shown in dotted lines in Fig. 1, causing the scale to register the strength or torque of the motor in foot pounds.

The invention claimed is:

1. A device for indicating the torque of a motor, including means for securing the motor in fixed position, a crane-like standard having a bearing therein through which said motor shaft is adapted to extend, an arm attached to said shaft, an indicating scale connecting the end of said crane-like standard and the other end of said arm, whereby the operation of said motor will tend to cause said arm to actuate said scale for indicating the foot pounds of torque thereof.

2. A device for indicating the torque of a motor, including means for securing the motor in fixed position, an arm attached to the shaft of said motor, a scale operatively connected to the other end of said arm, a standard mounted in alinement with the shaft of said motor and having a bearing through which said shaft is adapted to extend, the top of said standard extending over said arm for suspending the fixed end of said scale in position to permit the operation thereof by the downward movement of said arm.

In witness whereof, we have hereunto affixed our signatures.

JOSEPH C. SCHAF, JR.
WILLIAM J. HOLLIDAY.